A. H. Bryant,
Egg Box.
No. 101092. Patented Mar. 22, 1870.

Witnesses.
Villelly Anderson.
Chas. Kenyon.

Inventor.
Abner H. Bryant

United States Patent Office.

ABNER H. BRYANT, OF CHICAGO, ILLINOIS.

Letters Patent No. 101,092, dated March 22, 1870.

IMPROVEMENT IN EGG-CARRIER.

The Schedule referred to in these Letters Patent and making part of the same.

*To all whom it may concern:*

Be it known that I, ABNER H. BRYANT, of Chicago, in the county of Cook and State of Illinois, have invented a new and valuable Improvement in Egg-Carriers; and I do hereby declare that the following is a full, clear, and exact description of the construction and operation of the same, reference being had to the annexed drawings making a part of this specification, and to the letters and figures of reference marked thereon.

My invention relates to means for packing and transporting eggs, and consists in the construction and novel arrangement of cells of paper, or other proper material, formed by the union of two strips molded or pressed in shape, and adapted to hold single eggs in separate compartments, separated from all others by a double wall.

Figure 1:
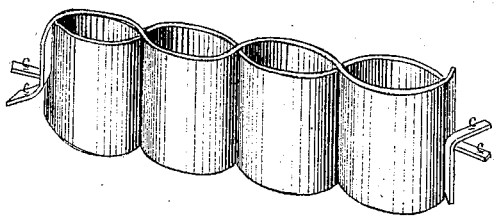
Figure 2:
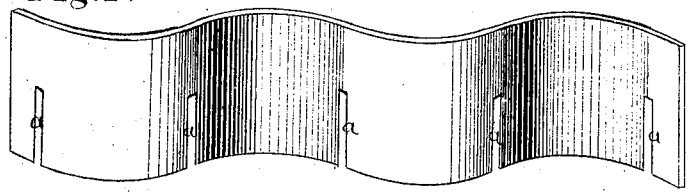
Figure 3:
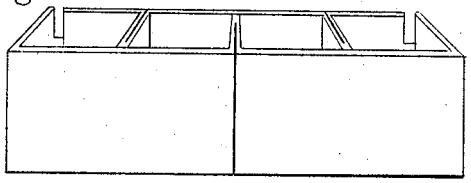
Figure 4:
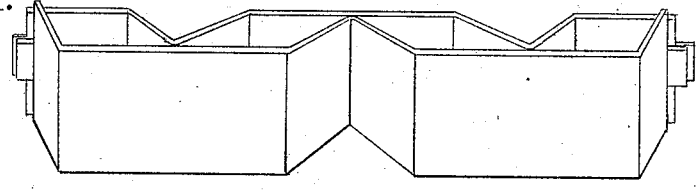
Figure 5:
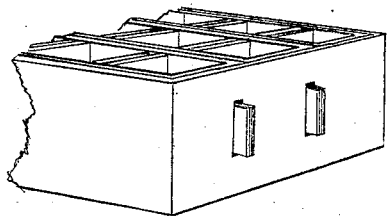

Figures 1 and 2 of the drawings represent a series of cells constructed of two strips, united by slats, and Figures 3, 4, and 5, represent a modification thereof, formed by similar strips, molded and bent into a square shape.

To form the circular cells, I take two strips of suitable length to form a series of three or more, and mold them upon a former until they assume the shape represented on fig. 2. I then cut slots in the bottom of one strip and in the top of the other, and unite them, when they assume the shape shown on fig. 1.

The slots above mentioned are shown by letter *a*.

The letter *c* represents ears or lugs formed in the ends of these strips respectively, and adapted to pass through openings in the holding-box, to hold the rows of cells in position.

My quadrangular cells are formed by taking two strips of proper length, and molding and bending them in shape until they assume the form represented on fig. 3.

While in process of forming, and before being ready to place in its box, this series of cells has the shape represented on fig. 4.

When completed and in place these cells have the form shown in fig. 5, with a double wall between each of the cells.

I claim as my invention—

The circular and quadrangular cells herein described, constructed respectively of double strips, molded and bent into form as described, and provided with the lugs *a*, as and for the purpose specified.

ABNER H. BRYANT.

Witnesses:
  VILLETTE ANDERSON,
  CHAS. KENYON.